May 10, 1966

G. A. MITCHELL 3,250,362

WORKPIECE HANDLING APPARATUS

Filed Jan. 7, 1964

INVENTOR.
GEORGE A. MITCHELL
BY
ATTORNEY

May 10, 1966

G. A. MITCHELL 3,250,362

WORKPIECE HANDLING APPARATUS

Filed Jan. 7, 1964

INVENTOR.
GEORGE A. MITCHELL
BY
ATTORNEY

United States Patent Office 3,250,362
Patented May 10, 1966

3,250,362
WORKPIECE HANDLING APPARATUS
George A. Mitchell, 920A Kendis Circle,
Youngstown, Ohio
Filed Jan. 7, 1964, Ser. No. 336,205
8 Claims. (Cl. 193—35)

This invention relates to workpiece handling apparatus, and more particularly to apparatus for transferring long slender tubular members, bars and the like from a loading station to an unloading station for discharge and/or further processing.

Although the invention finds utility in equipment such as pipe testers, upsetting machines, bar handling equipment and the like which require conveyance of long slender workpieces from a loading station to an unloading station for discharge along a specific path of travel, it is particularly adapted for use with drawbenches, and especially tube drawbenches.

As is known, a tube drawbench comprises, essentially, a die through which a tube is drawn and a draw carriage movable along a track extending parallel to the axis of the die on one side thereof for pulling tubes through the die. In the drawing operation, a tube to be drawn is initially loaded onto an elongated mandrel extending parallel to the axis of the die on the side thereof opposite the draw carriage, and a reduced diameter end of the tube pushed through the die by the mandrel. Thereafter, gripper jaws on the draw carriage grip the reduced tube end extending through the die and the draw carriage is forcibly pulled away from the die. In this process the tube is reduced in diameter and elongated as it is pulled through the annular opening defined between the periphery of the die and that of the mandrel.

On the tube drawbenches wherein a minimum of dead cycle time is desirable, a structure is provided which enables loading the tubes on one mandrel rod or a set of mandrel rods while simultaneously drawing additional ones of the tubes from a second duplicate mandrel rod or set of mandrel rods. Heretofore, many different arrangements have been proposed to accomplish this operation. The most successful and, hence, the most commonly used arrangement is the rotary mandrel assembly.

In this mechanism, a support structure is provided which carries at least two mandrel rods, one on the centerline of draw and the other parallel to the first but at a higher elevation. The second mandrel rod is positioned in alignment with the loading deck which normally is above the bench bed. Hence, while a tube is being loaded on the second mandrel rod, a tube is being drawn from the first mandrel rod now disposed on the centerline of draw. It should be noted that more than one mandrel rod may be mounted at each level whereby a plurality of tubes may be loaded onto the upper mandrel rods while simultaneously a plurality of tubes are being drawn.

The tube support structure is provided with ring segments at spaced points along its length. The ring segments are supported on roller members mounted on stands, the arrangement being such that the entire tube support structure may be rotated about its central axis whereby first one of the mandrels is brought into alignment with the centerline of draw and then the other mandrel is brought into alignment with the centerline of draw. That is to say, the tube support structure may be rotated through 180° of arc thereby exchanging the positions of the mandrel rods. The rotary mandrel end method of supporting tubes normally is employed on a multiple draw machine which handles relatively long lengths of starting tubes. Further, this type of drawbench normally is of the light or intermediate capacity, i.e., from 15,000 ot 100,000 pounds where the range of starting tube diameters is small, that is, from about a three-inch maximum outer diameter to about a three-quarter of an inch maximum outer diameter.

Since this range of tube sizes gives a variation of only two and one-quarter inches from the smallest to the largest diameter tube, it is possible to support the individual mandrel rods in a variety of ways. For example, each mandrel rod may be supported in a continuous tubular shroud, an intermittent shroud composed of short bell mouthed sections, or by groups of four opposed rollers spaced at various points along the length of the mandrel rod. In any case, when the entire unit is rotated through 180° of arc, the tube exchanges sides in its supporting enclosure. The distance of fall within the supporting enclosure is relatively small for the minimum diameter tubes and practically non-existent for the maximum diameter tubes on the low and intermediate capacity benches.

Recently, the rotary mandrel assembly type of tube support has been considered for use in heavy capacity, single tube drawbenches for handling a wide range of starting tube sizes, for example, from about fifteen-inch maximum outer diameter to about three-inch minimum outer diameter. In heavy capacity drawbenches, the drawing operation normally is a relatively slow process while the return speed of the draw carriage may be relatively fast. Further, the large diameter tubes require a certain amount of handling to transfer them from the storage area, to align them to the mandrel rod, and to push them onto the mandrel rod. It should be evident that most of the operator's idle time occurs during the drawing operation. Thus, by employing the rotary mandrel assembly the operator's idle time may be conveniently employed in loading the next tube to be drawn.

The primary object of this invention is to provide an improved workpiece handling apparatus for transferring long, slender workpieces from a loading station to a work station.

More specifically an object of the invention resides in the use of a workpiece handling apparatus, similar to a rotary mandrel assembly of the type described, and which incorporates a plurality of pairs of opposed, freely rotatable, troughed roller members for supporting the workpieces.

Another object of this invention is to provide a workpiece handling apparatus having tube support roller members whose position may be adjusted to accommodate relatively large tubes as well as relatively small tubes.

Still another object of this invention is to provide a workpiece handling apparatus having tube support roller members whose positions may be simultaneously adjusted from one location, convenient to an operator.

A further object of this invention is to provide apparatus for handling stainless steel tubing whose outer surface must be protected from scratches and the like.

In accordance with the invention, apparatus is provided for supporting long, slender tubular members or the like received from a loading station and then transferring the tubular members to a second position for discharge along a specific path of travel and/or for further processing. The tubular members are supported by pairs of troughed roller members which define a generally diamond shaped central area through which the workpieces extend. The size of the diamond shaped areas may be adjusted to accommodate the tubular members of different sizes. The adjustment of the size of the diamond shaped area is accomplished by movement of all the pairs of roller members simultaneously from one convenient location. The roller members are freely rotatable about their central axes and are in rolling contact with the tubular members during loading thereon and discharge therefrom. The rolling contact will, of course, prevent scratching or marring of the outer surface of the tubular members which is a most desirable feature when handling stainless steel tubes, for example.

Further, in accordance with the invention, the workpiece handling apparatus may be adapted to support long slender tubular members for transfer from a loading platform to a feed position for discharging the tubes to drawing dies. The adaptation of the present workpiece handling apparatus for use with a drawbench may be accomplished by providing mandrels which extend centrally between the pairs of roller members. As is known, the mandrels cooperate with die openings of a drawing die to effect a reduction in the diameter and wall thickness of the tubes.

As stated above, the present workpiece handling apparatus may be adapted for use with a variety of different workpiece processing equipment. However, in order to show the utility of the present workpiece handling apparatus, it will be described and illustrated in conjunction with a drawbench.

Th above and other objects and advantages of the present invention will become apparent from the following detailed description by reference to the accompanying drawings, in which.

Figure 1:
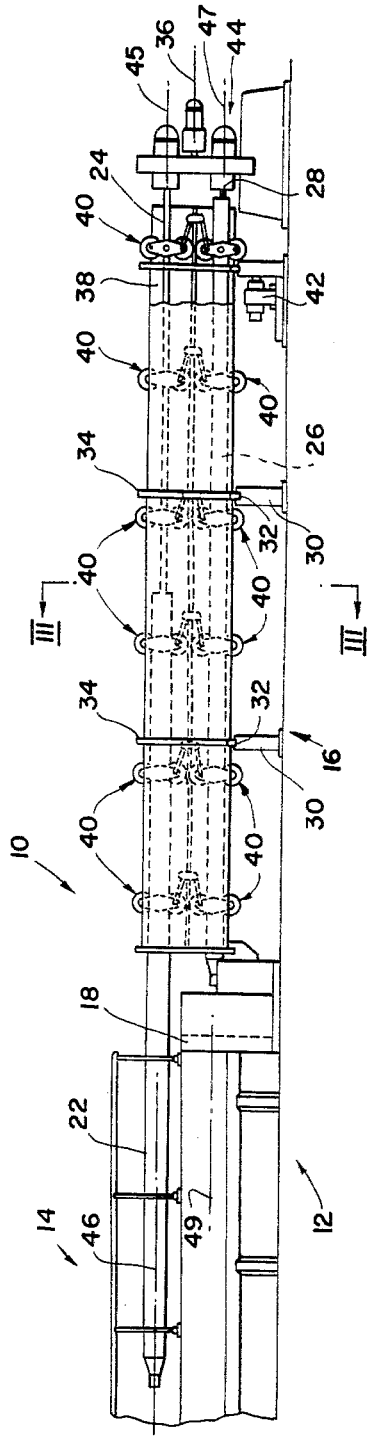
FIGURE 1 is a side view illustrating the rotary mandrel end of a drawbench provided with a workpiece handling apparatus of the present invention.
Figure 2:
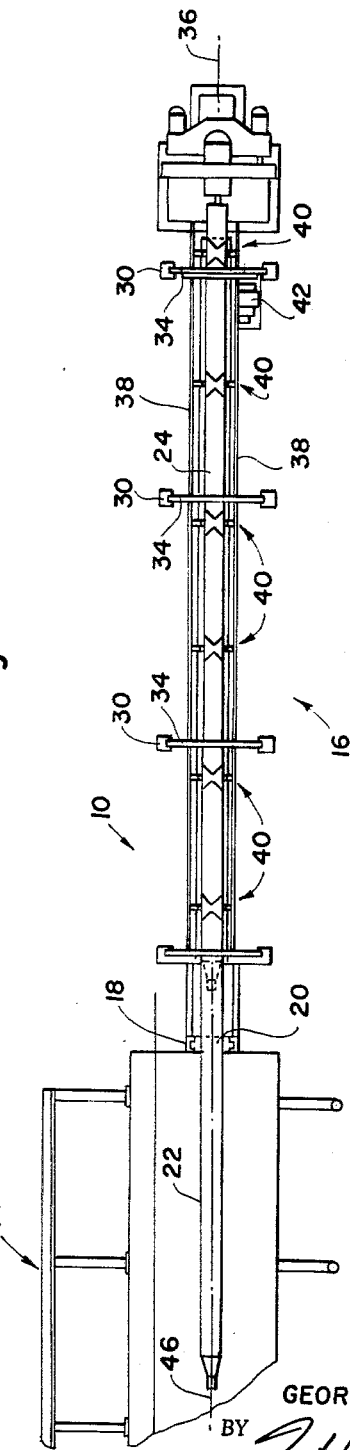
FIG. 2 is a plan view of the drawbench of FIG. 1.

Referring now to FIGS. 1 and 2, there is illustrated a drawbench 10 comprising a drawing section 12, a loading platform 14 positioned above the drawing section 12, and a workpiece handling apparatus or rotary mandrel assembly 16.

The drawing section 12 has not been illustrated in detail since it may take any one of a variety of forms well known in the art. For the purpose of the present invention, it will be sufficient to state that the drawing section normally includes a draw carriage movable along a track structure and a suitable drive means for moving the draw carriage back and forth along the track structure. The draw carriage normally includes gripper jaws which are adapted to clamp the end of the tube projecting through a die for pulling the tube through the die for the purpose of elongating it and for reducing its diameter while simultaneously imparting cold-working properties to the workpiece. In FIG. 2, a die stand 18 is shown supporting a drawing die 20.

The drawbench 10, as illustrated in the drawings, is adapted for simultaneously loading one tube 22 onto a mandrel 24 while drawing a second tube 26 from a second mandrel 28 through the die 20. As will become apparent later in the specification, the drawbench 10 could be adapted to simultaneously load a plurality of tubes onto a plurality of mandrels while drawing a second plurality of tubes from a second plurality of mandrels.

The loading platform 14 serves to receive the next tube to be drawn and from which the operator may load the tube 22 onto the mandrel 24.

The rotary mandrel assembly 16 includes a plurality of stands 30 having roller members 32 upon which are supported a plurality of ring members 34 which are mounted for rotation about the central axis 36 of the rotary mandrel assembly 16. In this instance, a pair of side plate members 38 are secured to the ring members 34 for rotation therewith and which support a plurality of longitudinally spaced, upper and lower workpiece supporting roller assemblies 40 serving to support the tubes 22, 26 during the loading and drawing operations. Adjacent to the end of the rotary mandrel assembly 16, there is provided a drive means 42 which rotates the assembly 16 about the central axis 36. At the end of the assembly 16 there is provided a mandrel advancing mechanism 44 which serves to advance the lower mandrel 28 together with the tube associated therewith toward the die stand 18, the arrangement being such that the leading or reduced end of the tube is inserted through a die opening in the drawing die 20 whereupon the aforementioned gripper jaws of a draw carriage grip the reduced end of the tube as explained above.

As can best be seen in FIG. 1, the upper ones of the workpiece supporting assemblies 40 maintain the tube 22 is aligned with a first longitudinal centerline 45 which is spaced from and parallel to the central axis 36 and is coincident with a loading axis 46 of the loading platform 14. The lower ones of the workpiece supporting assemblies 40 maintain the tube 26 aligned with a second longitudinal centerline 47 which is spaced from and parallel to the central axis 36 and is coincident with a longitudinal draw axis 49 of the die 20. As will be described later in the specification, the rotary mandrel assembly 16 is rotated through 180° of and about the central axis 36, at the completion of drawing the tube 26 through the die 20. When rotated, the tube 22 will be in position to be drawn through the die 20 while another tube is pushed onto the mandrel rod 28 which now is aligned with the loading platform 14.

Figure 3:
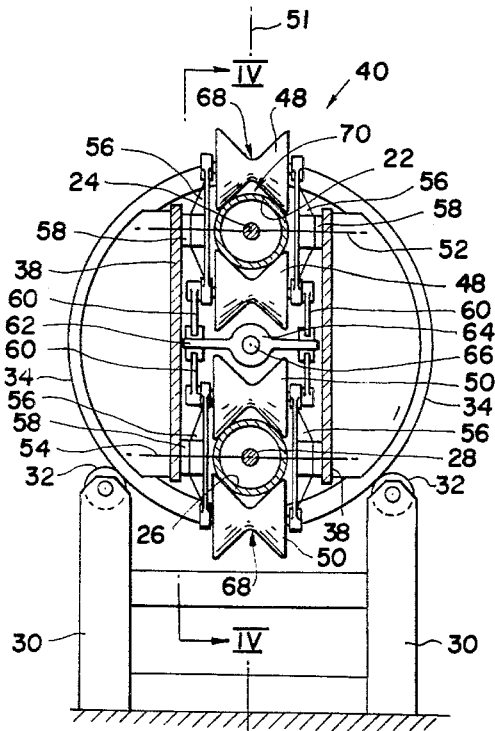
FIG. 3 is a cross-sectional view, taken along the line III—III of FIG. 1, illustrating the workpiece handling apparatus of the present invention.
Figure 4:
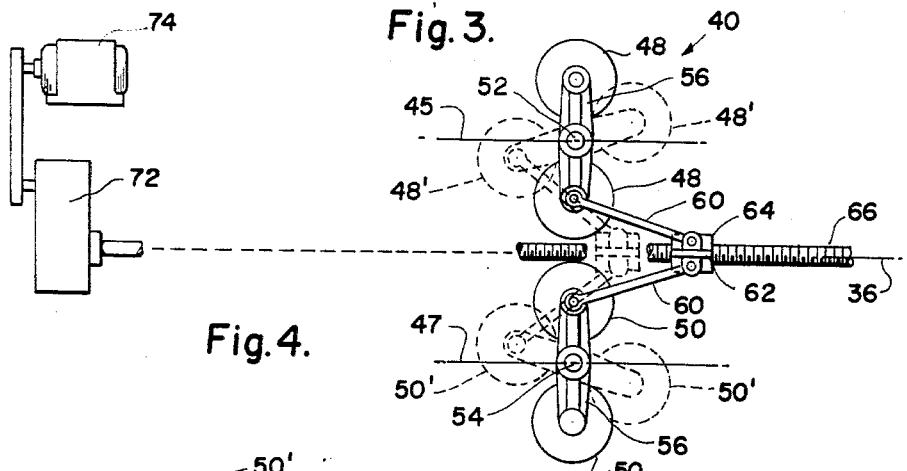
FIG. 4 is a cross-sectional view, taken along the line IV—IV of FIG. 3, illustrating the adjustability of the present workpiece handling apparatus.

Referring now to FIGS. 3 and 4, there is illustrated a pair of the workpiece supporting assemblies 40. As can be seen, each of the workpiece supporting assemblies 40 comprise a pair of roller members 48, 50 each mounted for pivotal movement about spaced, parallel transverse axes 52, 54. The transverse axes 52, 54 are normal to and intersect the longitudinal axes 45 and 47 respectively and a vertical plane represented by the dash-dot line 51 which passes through the central axis 36 and the longitudinal axes 45, 47. Since the construction of both pairs of roller members 48, 50 is identical, description of one of them will be sufficient.

The pair of roller members 48 are connected by means of pivotal arms 56, one each on each side thereof. The pivotal arms 56 are mounted for rotation on suitable journal members 58 secured to the side plate members 38. Connecting arms 60 extend between one end of the pivotal arms 56 and a connecting plate 62 having an internally threaded hub member 64 engaged with a threaded rod member 66. The internally threaded hub member 64 and the threaded rod 66 comprise means for simultaneously adjusting the position of the roller members 48, 50, as will become apparent later in the specification.

As best seen in FIG. 3, each of the roller members 48, 50 preferably have a generally concave outer periphery 68 which in this case is V-shaped, the side walls of which are adapted to engage a tube at spaced points on its periphery. The roller members 48, 50 also can be considered as troughed rollers. In any event, both of the rollers 48, for example, cooperate to define a generally diamond-shaped area 70. Each tube, then can be considered as an inscribed circle which is tangent at four points to the side walls of the concave outer periphery 68 of the roller members 48. It should be evident then that regardless of the orientation of the pairs of roller members 48, 50 with respect to the central axis 36 (see FIG. 1), the tubes will be maintained on a fixed centerline.

The roller members 48, 50 support the tubes and prevent them from moving in any direction during movement thereof from the loading position to the drawing position. The roller members 48, 50 also are freely rotatable about their central axes. Thus, the roller members 48, 50 are particularly useful for supporting stainless steel tubing whose outer surface must be protected from scratches and the like.

Figure 5:
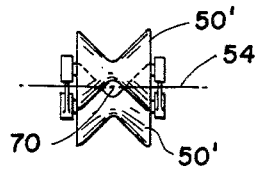
FIG. 5 is a fragmentary front view of one of the pairs of roller members employed in the present workpiece handling apparatus which have been positioned to accommodate a workpiece of minimum diameter.

In FIG. 4, the roller members 48, 50 are illustrated in two extreme positions of adjustment. The roller members 48, 50 illustrated in full lines are positioned vertically and receive tubes having a relatively large outer diameter while the roller members 48', 50' illustrated in dotted outline are inclined so as to receive tubes having a relatively small outer diameter. When the roller members 48, 50 are positioned vertically, the generally diamond-shaped area 70 is of maximum cross section and therefore will accommodate a maximum diameter tube. When the roller members are inclined, as illustrated in FIGS. 4 and 5 at 48' and 50', the generally diamond-shaped area 70 is of minimum cross section and therefore will accommodate a minimum diameter tube. At positions between the two extreme positions, the roller members 48, 50 will accommodate tubes having intermediate size diameters. It is important to note, that regardless of the position of the roller members 48, 50, the tubes are supported and maintained on a fixed centerline.

In order to position the roller members 48, 50 so that they will accommodate a specific size tube, the hub member 64 must be moved in the appropriate direction. To this end, the threaded shaft 66 extends throughout the length of the rotary mandrel assembly 16 and terminates at a location close to the operator of the drawbench 10. At this location, there is provided suitable means for rotating the shaft 66 through a desired number of revolutions whereby the roller members 48, 50 will be positioned as desired. This means for rotating the shaft 66 may take any number of suitable forms. For example, the shaft 66 may be connected to a gear reducer 72 which, in turn, is connected to a reversible drive motor 74. The gear reducer 72 may be provided with means for indicating the diameter of tube which the roller members 48, 50 will accommodate.

Hence, rotating of the shaft 66 in one direction will cause the hub member 64 to move to the right of FIG. 4 thereby pulling the roller members 48, 50 toward a vertical position through the action of the connecting arms 60. Alternatively, when the shaft 66 is rotated in the opposite direction, the hub member 64 will be moved to the left of FIG. 4 thereby causing the roller members 48, 50 to move toward the inclined position through the action of the connecting arms 60.

In the operation of the drawbench 10, the mandrel advancing mechanism 44 is activated so as to push the tube 26 into the die 20 whereupon the aforementioned gripper jaws of the draw carriage clamp the projecting tube end and begin to draw the tube 26 through the die 20. During the drawing operation, a second tube 22 is pushed onto the mandrel rod 24 and through all of the roller members 48 until it is positioned on the mandrel rod 24. At the completion of the drawing operation, the drive means 42 is activated so as to rotate the rotary mandrel assembly 16 about its central axis 36 whereby the mandrel rods 24, 28 exchange positions. At this time, the tube 22 is in alignment with the longitudinal draw axis 49 preparatory to its being pushed into the die 20. As the tube 22 is being drawn through the die 20, another one of the tubes 26 is being pushed onto the mandrel rod 28 which now is positioned in alignment with the loading platform 14.

It should be evident, then, that the present workpiece supporting assemblies 40 serve three important functions. First, they maintain the tube in a fixed position during loading onto the mandrel rod, during rotation from the elevated loading to the drawing position, and during the drawing operation. Second, they prevent marring of the tube surface during loading, transfer and discharge. Third, when the tubes are rotated into the drawing position, they are automatically aligned with the centerline of draw and require no further adjustments. This is a desirable feature in that heretofore, rotary mandrel end assemblies have required the tubes to be aligned with the centerline of draw. That is to say, that heretofore, the tube supporting structure permitted the tubes to move out of alignment with the draw axis and had to be re-aligned at the leading end by some additional means.

Although the present invention has been illustrated in connection with one specific embodiment, it will be readily apparent to those skilled in the art that certain changes of form and arrangement of parts to suit requirements may be made without departing from the spirit and scope of the present invention. To this end, it should be evident that more than one pair of the roller members 48 and a like number of pairs of the roller members 50 may be provided for supporting a plurality of the tubes 22, 26. Also these roller members 48, 50 may be connected to the hub member 64 whereby they will all be simultaneously positioned to accommodate tubes of various diameters.

I claim as my invention:

1. In apparatus for supporting long slender members in alignment with a preselected axis, the combination of a plurality of roller assemblies spaced along said preselected axis, said roller assemblies comprising arms pivotal about axes which are normal to said preselected axis, rollers carried on said arms on opposite sides of said preselected axis, and means for pivoting said arms about their pivotal axes and hence said rollers into supporting engagement with said member.

2. The combination of claim 1 wherein each of said rollers is trough-shaped, each pair of rollers cooperating to define a central area through which the member extends.

3. In apparatus for centering and supporting an elongated member with respect to a preselected axis, the combination of a plurality of arms spaced along said preselected axis; means supporting said arms for pivotal movement about axes which are perpendicular to and intersect said preselected axis; roller members carried on said arms at opposite ends thereof; and means for pivoting said arms about their pivotal axes in the direction of said preselected axis whereby said roller members engage and support said member centered with respect to said preselected axis.

4. In a transfer mechanism adapted to receive elongated workpieces and support the same in alignment with a first axis and then transfer said workpieces into alignment with a second axis for discharge therealong, the combination comprising at least one set of uniformly spaced workpiece supporting assemblies; means for supporting said workpiece supporting assemblies for movement alternately into alignment with said first axis and said second axis; said workpiece supporting assemblies comprising spaced-apart roller members, means for supporting said roller members in pairs and for arcuate movement toward and away from opposite sides of an associated one of the axes, and means for moving said roller members away from said first axis to receive a workpiece therebetween and then into supporting engagement with a workpiece; and means for moving said set of workpiece supporting assemblies into alignment with said first axis for receiving and supporting a workpiece in alignment with said first axis and then into alignment with said second axis for discharging said workpieces along said second axis.

5. In a transfer mechanism adapted to receive elongated workpieces and support the same in alignment with a first axis and then transfer said workpieces into alignment with a second axis for discharge therealong, the combination comprising spaced sets of workpiece supporting assemblies; means for supporting each of said sets of workpiece supporting assemblies for movement alternately into alignment with said first axis and said second axis; said workpiece supporting assemblies comprising spaced-apart roller members, means supporting said roller members in pairs and for arcuate movement about pivotal axes extending normal to said first and second axes and between each pair of said roller members, and means for moving said roller members toward and away from said first and second axes; and means for moving each of said sets of workpiece supporting assemblies successively into alignment with said first axis for receiving and supporting the workpiece in alignment with said first axis and then into alignment with said second axis for discharging said workpieces along said second axis.

6. The combination of claim 1 wherein said pivoting means connects all of said arms for simultaneous pivoting about their pivotal axes.

7. In a transfer mechanism adapted to receive elongated workpieces and support the same in alignment with a first axis and then transfer said workpiece into alignment with a second axis for discharge therealong, the combination comprising spaced sets of workpiece supporting assemblies; means supporting said sets of workpiece supporting assemblies for rotation about a third axis intermediate of said first axis and said second axis; each of said workpiece supporting assemblies comprising spaced-apart roller members, means supporting said roller member in pairs and for arcuate movement about pivotal axes extending normal to said first and second axes and positioned between each pair of said roller members, and means for pivoting said roller members about their respective pivotal axes to effect a change in the spacing between each pair of roller members; and means for rotating said workpiece supporting assemblies about said third axis whereby each said workpiece supporting assemblies is brought into alignment with said first axis for receiving and supporting elongated workpieces and then into alignment with said second axis for discharging said elongated workpieces along said second axis.

8. In a drawbench having a drawing die and a loading platform adjacent thereto and extending therefrom in the direction of draw, the combination comprising a rotary mandrel assembly adjacent to said drawing die and extending away from the direction of draw; at least one set of workpiece supporting assemblies supported by said rotary mandrel assembly at spaced positions along its length for movement into alignment alternately with a loading axis of said loading platform and a drawing axis of said drawing die; each of said workpiece supporting assemblies comprising at least one pair of spaced-apart roller members, said roller members being freely rotatable, a mandrel extending centrally between the roller members of said set of workpiece supporting assemblies, and means for moving said roller members toward and away from opposite sides of said mandrel; and means for moving said rotary mandrel assembly and hence said set of workpiece supporting assemblies and said mandrel sequentially into alignment with said loading axis for receiving and supporting workpieces from said loading platform and then into alignment with said drawing axis for discharging said workpieces to said drawing die while supporting said workpieces and said mandrel in alignment with said drawing axis.

References Cited by the Examiner

UNITED STATES PATENTS

| 2,472,231 | 6/1949 | Rodder | 205—3 |
| 3,156,396 | 11/1965 | Snyder et al. | 226—199 |

FOREIGN PATENTS

| 1,084,673 | 7/1960 | Germany. |

RICHARD J. HERBST, *Primary Examiner.*

CHARLES W. LANHAM, *Examiner.*

H. D. HOINKES, *Assistant Examiner.*